United States Patent [19]

Taylor

[11] Patent Number: 4,595,860
[45] Date of Patent: Jun. 17, 1986

[54] AUTOMATIC INDOOR LAMP UNIT

[76] Inventor: Mark O. Taylor, 20811 Marine View Dr., S.W., Seattle, Wash. 98166

[21] Appl. No.: 613,575
[22] Filed: May 24, 1984
[51] Int. Cl.⁴ ............................................. H05B 37/02
[52] U.S. Cl. .................................... 315/158; 315/151; 315/156; 315/360
[58] Field of Search ................. 315/360, 156, 158, 151

[56] References Cited
U.S. PATENT DOCUMENTS

| | | | |
|---|---|---|---|
| 3,130,349 | 4/1964 | Mallory | 315/156 |
| 3,584,257 | 6/1971 | Adams | 315/360 |
| 4,198,563 | 4/1980 | Eisner | 315/360 |
| 4,198,574 | 4/1980 | Price et al. | 315/360 |

Primary Examiner—Harold Dixon

[57] ABSTRACT

An indoor lamp and electronic circuit unit that may function in either an automatic mode or operate as any other normal lamp with manual control. When operated in the automatic mode the said lamp unit will turn on in response to a predetermined local ambient light level. The light level is detected and processed via a photo-transistor and electronic circuitry. Once the said lamp units light turns on the light will then remain on regardless of the light level detected by the said photo-transistor for a specified period of time. After this time has ellapsed the lamp unit will turn off. The process may begin over if the local ambient light level is again below the predetermined level. When operated in a normal or manual control mode the said lamp unit will turn on or off only in response to manually operating the lamp units switch.

1 Claim, 2 Drawing Figures

AUTOMATIC INDOOR LAMP UNIT

BACKGROUND OF THE INVENTION

The present invention relates to an indoor lamp and circuit unit for automatic regulation of indoor lighting. One purpose being to have a lamp that functions automatically while at home. Another purpose being, with the current interest in crime prevention, to have a light on while not at home. People arriving home in the evenings also enjoy the convenience of having a lamp on when they arrive. Previous methods of accomplishing this included: 1. use of timers. 2. use of photo-sesitive devices. 3. or simply having lights on continuously.

Each of these methods has it's own respective disadvantages. Timers may turn on when not intended due to temporary power failures. Also, though the timing of a timer may be easily mastered with a little thought, there still are controls to set to get the desired timing for the light to come on. Photo-sensitive devices currently in use to control indoor lighting have to be shielded from the light source they switch on. These devices, to avoid reflected light also, are best placed facing out a window. This can be an inconvenience to the home owner who has to find the proper place for the device. Current photo-sensitive devices allow partial power delivery to the load, light, during the transition from light to darkness. This can be an inconvenience for the person at home expecting to use the lamp. Current photo-sensitive devices also are not a part of the indoor lamp as a unit. The third method, the lamp being used for security purposes, will ensure that a light will be on but also will cause a needless use of electric power during the daytime.

This invention eliminates these problems. A temporary power failure won't alter timing and there are no controls to set. The photo-sensitive device used in this invention need not be shielded from the light it turns on. Also the lamp is either fully on or fully off for the convenience of the person using the lamp during twilight hours. Finally there is no needless power used during daylight hours when the intended use is for security purposes.

This invention, though function is intended, has a novelty value also. An ordinary lamp that can turn itself on and off or can be turned on by placing a hand over the photo-sensitive device, in this case a photo-transistor, is unusual and not expected with todays indoor lamps. Also, the novelty of this invention can be compared to that of the new touch lamp, though there are differences in function, both operate in unexpected interesting ways. (Note: With the touch lamp if you touch certain parts of the lamps chasis it will turn on the lamp.)

SUMMARY OF THE INVENTION

The present invention was designed to achieve certain spacific requirements. These were that the invention would: 1. be simple and safe to use. 2. have dependable timing. 3. operate in only OFF and ON states. 4. not require shielding of the photo-sensitive component. 5. function as completely normal or automatic lamp and function as a security device.

The preferred embodiment uses a three wire power chord to electrically connect the lamp unit to a 110 volt 60 hz power source. Also there is a series switch and fuse which electrically connect or disconnect the lamp unit from the power source. A third wire of the power chord is used to absolutely ground the lamp chasis making the lamp a safer unit.

The preferred embodiment of the lamp unit uses a collector voltage of a photo-transistor to trigger activation of power in the load, for this unit a light bulb. The result being that the timing or turning on of the lamp is independent of timing circuitry. Temporary power failures during daylight illumination level periods will not alter the time when the lamp turns on.

Activation of power in the load results from the output of a Schmitt Trigger going high. Power is subsequently effectively disconnected from the load as a result of this same Schmitt Trigger output dropping to zero volts. Because of the action of the Schmitt Trigger the lamp unit then can operate in only one of two states, fully ON or OFF. Two state operation is desirable during twilight hours and also when the lamp is operated in a normal lamp mode discussed later.

As mention this invention uses a collector voltage level of a photo-transistor to activate power in the load. With darkness increasing so does this collector voltage increase. Once a predetermined voltage level is reached the lamp will turn on. The lamp will the remain on for approximately 1 hour, regardless of the ambient illumination level detected by the unit ie. collector voltage level of the photo-transistor. The desired consequence of the lamp remaining on is that the photo-transistor does not have to be shielded from the light source that its own action triggered turning on.

The preferred embodiment of this invention has two modes of operation, an automatic mode and a normal lamp mode. In the automatic mode this invention may operate as a security device or simply as an automatic selfstarting lamp. In the normal mode this invention will function effectively the same as any other typical home indoor lamp. The automatic mode differs from the normal mode basically in two ways. While in the automatic mode and with power electrically connected to the unit the light will turn on automatically when the ambient light level reaches a determined low level. If the lamp unit is in the normal mode however, the user may manually control when the lamp is on or off. The lamp will then remain on or off regardless of ambient light levels. The second difference between the two modes is that a testing procedure to determine the illumination level occurs every hour when the unit is operating in the automatic mode. If there are any drawbacks to this invention this is it. The unit must turn itself off to test for the illumination level caused by sources other than itself. Then if darkness is detected the unit will return to the on state. The duration of the testing period is kept to a minimum, about 0.5 seconds. This testing procedure does not occur if the unit is operating in the normal lamp mode.

DESCRIPTION OF THE DRAWINGS

Included for the purpose of aiding in the description of the preferred embodiment of this invention are two drawings.

Figure 1:
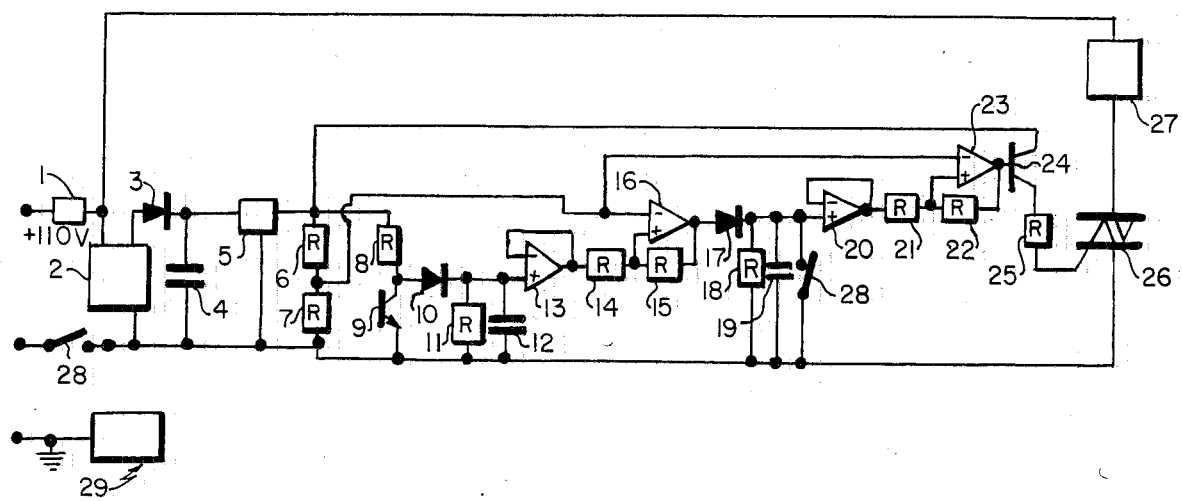
FIG. 1 is the lamp units circuit diagram.
Figure 2:
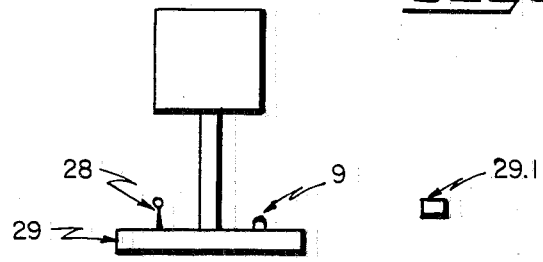
FIG. 2 is a configuration of a typical lamp unit.

Note: The circuit is located within the base of the lamp chasis.

DESCRIPTION OF THE PREFERRED EMBODIMENT

The following will refer to FIG. #1 for this inventions cicuit description.

The unit uses a three wire power chord to electrically connect the unit to a 110 volt 60 hz power source. One hot wire is connected via a fuse #1 to a transformer #2 and load #27 hot ends. A second reference ground wire is used to electrically connect a reference ground to the circuit via a SPDT switch #28. The absolute ground third wire is electrically connected to the units chasis as a safety factor.

The SPDT switch #28 regulates whether or not power can be delivered to the unit. With the switch closed between the power source and transformer #2 cold end, electric power is delivered to the unit ie. the unit is turned on. However, power is not delivered to the load #27 unless the triac #26 is conducting. The triacs conduction is in turn controlled by a DC signal generated by the units circuitry applied to its gate.

The circuitry is powered by a power supply consisting of a transformer #2, diode #3, capacitor #4, and a five volt regulator #5. A second reference voltage is determined by the voltage divider network consisting of resistors #6 and #7. This reference voltage is applied to two separate Schmitt Triggers.

The resistor #8 and photo-transistor #9 are the circuit components that transduce the ambient illumination level into a representative voltage level. The lower the illumination level the less the photo-transistor will conduct. Consequently a higher photo-transistor collector voltage is present with a lower illumination level. A high voltage here triggers on a high DC signal that is applied to the triac #26 which causes the triac to conduct.

To follow the contributions of the individual circuit components first consider the case when a high ambient illumination level is present. A low photo-transistor collector voltage will be present and any residual voltage on capacitor #12 will discharge through resistor #11. A low voltage applied to the voltage follower configuration of op-amp #13 in turn will cause a low voltage to be applied to the input of its associated Schmitt Trigger. The Schmitt Trigger consists of resistor #14, resistor #15, and op-amp #16. The inverting input to the op-amp #16 is electrically connected to a reference voltage determined by the voltage divider network of resistors #6 and #7. The output of this Schmitt Trigger can be only one of two states, zero or that of the power supplies. A low input voltage to the Schmitt Trigger causes the Schmitt Trigger to have a zero output voltage.

A zero output voltage from the said first Schmitt Trigger is applied to the input of a second voltage follower and Schmitt Trigger pair. Note: The SPDT switch #28 connected across capacitor #19 will be open with the unit on. This will cause any residual voltage on capacitor #19 to discharge through resistor #18. When the capacitor is sufficiently discharged the output of this second voltage follower will be low and its associated Schmitt Trigger will have a zero output voltage.

The second Schmitt Trigger output is electrically connected to the base of a transistor #24. The emitter current of this transistor is the gate current of triac #26. When the Schmitt Trigger output is zero this transistor will not conduct. Since a current is required in the gate of the triac #26 for the triac to conduct the triac will not conduct when transistor #24 is not conducting. Consequently power in the load #27 is blocked and the units light is off.

In summary, with a high ambient illumination level any residual voltages on capacitors #12 and #19 will discharge through resistors #11 and #18 respectively. When capacitor #19 is sufficiently discharged a Schmitt Trigger consisting of resistor #21, resistor #22, and op-amp #23 will maintain a zero output voltage. This voltage in turn causes a triac #26 to not conduct and block power from the units load #27, light bulb.

In the case of a low ambient illumination level the collector voltage of the photo-transistor #9 will approach the power supply voltage of 5 volts DC. The capacitor #12 will then charge to this same voltage less the forward voltage drop across the diode #10. The output of the first voltage follower consisting of op-amp #13 will be the same as the capacitor #12 voltage. This voltage follower output voltage is applied to the iput of an associated Schmitt Trigger consisting of resistor #14, resistor #15, and op-amp #16. The output voltage of this Schmitt Trigger will consequently be high. This high output is then applied to the second voltage follower and Schmitt Trigger pair causing capacitor #19 to charge and the output of the second Schmitt Trigger to go high.

With approximately 5 volts now applied to the base of transistor #24 a DC voltage and current is supplied to the gate of the triac #26. This is sufficient gate power to fully turn on the triac and allow essentially full power to be delivered to the load #27. Note: Only full or zero power is delivered to the load due to the action of the Schmitt Trigger. Resistor #25 is a voltage dropping resistor used to limit power in the triac gate circuit.

With power in the units load #27, light bulb, the ambient illumination level will increase. This will be detected by the photo-transistor #9 and its collector voltage will drop toward zero volts. (See FIG. #2 for a typical light bulb and photo-transistor orientation.) Diode #10 will now become reverse biased until enough time has passed for capacitor #12 to discharge through resistor #11. The residual capacitor voltage, voltage on the capacitor before becoming completely discharged, is used to maintain the first voltage follower output voltage high enough to keep the subsequent paired Schmitt Trigger output at 5 volts. Sustaining the output of this first Schmitt Trigger at 5 volts is necessary to allow capacitor #19 to fully charge. After capacitor #12 is sufficiently discharged the first Schmitt Trigger output voltage may drop to zero and diode #17 will become reverse biased. Capacitor #19 can now begin discharging through resistor #18. When capacitor #19 is sufficiently discharged the output voltage of the second Schmitt Trigger will drop to zero volts turning off the triac #26 and preventing power in the load #27.

Without power in the load #27 the ambient illumination level will decrease. If this new level is low enough capacitor #12 will charge up and start the process described over again.

The length of time required to turn on the units light is primarily determined by the resistor #8 and capacitor #12 time constant. This period is kept to a minimum and in the preferred embdiment is approximately 0.5 seconds.

The length of time the units light stays on once triggered is primarily determined by the resistor #18 and capacitor #19 time constant. This time period is recommended to be approximately 1 hour.

In summary, for the case with a low ambient illumination, this unit will deliver all available source power to its load #27, light bulb. The light will remain on for a period of 1 hour and then completely shut off. If the ambient illumination level is low with the light off the unit will again deliver full power to the load #27. The testing period is kept to a minimum and in the preferred embodiment of this invention it is approximately 0.5 seconds.

Previously discussed was a detailed description of how this invention operates while in an automatic mode. This invention will also operate in a normal or manual lamp mode.

If capacitor #12 remains charged the Schmitt Trigger consisting of op-amp #16, resistor #14, and resistor #15 will maintain a high output voltage of approximately 5 volts. This high output voltage will in turn insure that capacitor #19 will remain fully charged. With capacitor #19 fully charged the Schmitt Trigger consisting of op-amp #23, resistor #21, and resistor #22 will maintain a high 5 volt output also. Finally with this second Schmitt Trigger output high the triac #26 will conduct and there will be essentially full power delivered to the load #27. A cover #29.1, FIG. #2, placed over photo-transistor #9 will prevent the photo-transistor from conducting regardless of the actual ambient illumination level. With the photo-transistor collector voltage high capacitor #12 will maintain a charge and power will be delivered to the load #27 ie. the units light will be on.

When a cover is used, control of the units light is effectively governed by the SPDT switch #28. As depicted in FIG. #1 the units light will be fully off. The switch in this position allows for capacitor #19 to instantaneously discharge and for power to be immediately blocked from the load. The switch when switched to its second position will allow power to the unit and capacitors #12 and #19 will quickly charge and power will be delivered to the load #27. The effect of this being is that the unit will effectively function as a normal lamp with manual control.

I claim:

1. An indoor lamp and electronic circuit unit comprising:
   a. a means of switching from OFF to ON of said lamps light in response to a local ambient light level via a photo-sensitive device and electronic circuitry,
   b. a means via electronic circuitry to ensure operation of said lamp unit in only one of two states fully ON or OFF,
   c. subsequent of an OFF to ON transition of said lamp units two states of operation a means to sustain the ON state of operation for a specified period of time via electronic circuitry, the ON state is sustained regardless of the ambient light level detected by the said photo-sensitive devise,
   d. a means of turning to OFF state of said lamp unit automatically subsequent to passing of said specified period of time via electronic circuitry,
   e. a means of turning to ON state of said lamp unit subsequent to transition from ON to OFF state of operation in response to an ambient light level detected by said photo-sensitive device,
   f. a means to manually operate said lamp unit continuously in either the OFF state or the ON state regardless of the ambient level detected by said photo-sensitive device.

* * * * *